United States Patent
Kobayashi et al.

(10) Patent No.: US 8,725,336 B2
(45) Date of Patent: May 13, 2014

(54) POWER TRANSMISSION CONTROL DEVICE FOR VEHICLE

(71) Applicant: Aisin AI Co., Ltd., Nishio (JP)

(72) Inventors: Kazutaka Kobayashi, Nishio (JP); Takeshige Miyazaki, Chiryu (JP)

(73) Assignee: Aisin AI Co., Ltd., Nishio-Shi (JP)

(*) Notice: Subject to any disclaimer, the term of this patent is extended or adjusted under 35 U.S.C. 154(b) by 0 days.

(21) Appl. No.: 13/623,293

(22) Filed: Sep. 20, 2012

(65) Prior Publication Data

US 2013/0073131 A1    Mar. 21, 2013

(30) Foreign Application Priority Data

Sep. 20, 2011    (JP) ................... 2011-204076

(51) Int. Cl.
*B60W 10/08*    (2006.01)
*B60W 10/10*    (2012.01)
*B60W 20/00*    (2006.01)

(52) U.S. Cl.
USPC .......... 701/22; 701/60; 701/67; 477/3; 477/5; 477/83; 180/65.265; 903/945

(58) Field of Classification Search
None
See application file for complete search history.

(56) References Cited

U.S. PATENT DOCUMENTS

| | | | | |
|---|---|---|---|---|
| 5,234,071 A | * | 8/1993 | Kajiwara | 180/169 |
| 2010/0168971 A1 | * | 7/2010 | Snyder et al. | 701/58 |
| 2010/0262324 A1 | * | 10/2010 | Hatori et al. | 701/22 |
| 2010/0263951 A1 | * | 10/2010 | Hayashi et al. | 180/65.275 |
| 2011/0251017 A1 | * | 10/2011 | Miyazaki | 477/5 |

FOREIGN PATENT DOCUMENTS

| | | |
|---|---|---|
| JP | 2000-224710 A1 | 8/2000 |
| JP | 1 640 234 A1 | 3/2006 |
| JP | 2006-097740 A1 | 4/2006 |
| WO | WO2012008332 * | 1/2012 |

* cited by examiner

*Primary Examiner* — Behrang Badii
*Assistant Examiner* — Demetra Smith-Stewart
(74) *Attorney, Agent, or Firm* — Burr & Brown, PLLC

(57) ABSTRACT

In this power transmission control device, an EV travel mode for traveling by using only an electric-motor driving torque in a state in which a clutch torque is maintained to zero, and an EG travel mode for traveling by using the internal-combustion-engine driving torque in a state in which the clutch torque is adjusted to a value larger than zero are selectively realized depending on a travel state. In a state in which the EV travel mode is selected, when it is determined that a vehicle speed is higher than a predetermined speed Vth, "a gear position to be realized" is changed depending on the travel state of the vehicle, and when it is determined that the vehicle speed is equal to or lower than the predetermined speed Vth, "the gear position to be realized" is maintained to a current gear position independently of the travel state of the vehicle.

4 Claims, 5 Drawing Sheets

POWER TRANSMISSION CONTROL DEVICE FOR VEHICLE

BACKGROUND OF THE INVENTION

1. Field of the Invention

The present invention relates to a power transmission control device for a vehicle, and more particularly, to a power transmission control device applied to a vehicle provided with an internal combustion engine and an electric motor as power sources, and also provided with a clutch.

2. Description of the Related Art

In recent years, a power transmission control device including a multiple gear ratio transmission having a plurality of gear positions and not having a torque converter, a clutch interposed between an output shaft of an internal combustion engine and an input shaft of the multiple gear ratio transmission and capable of adjusting a clutch torque (the maximum value of the torque which the clutch can transmit), and control means for controlling, depending on a travel state of a vehicle, by using actuators, the clutch torque and a gear position of the multiple gear ratio transmission has been developed (for example, see Japanese Patent Application Laid-open No. 2006-97740). This power transmission control device is also referred to as automated manual transmission (AMT).

In a vehicle equipped with the AMT, usually based on a map created in advance for prescribing a relationship between "an accelerator opening and a vehicle speed" and "a gear position to be realized", and on current values of the accelerator opening and the vehicle speed, the gear position to be realized is determined and changed.

Further, in recent years, a so-called hybrid vehicle provided with an engine and an electric motor (an electric motor and an electric power generator) as power sources has been developed (for example, see Japanese Patent Application Laid open No. 2000-224710). In the hybrid vehicle, a configuration may be employed in which an output shaft of the electric motor is connected to any one of en output shaft of the internal combustion engine, an input shaft of a transmission, and an output shaft of the transmission.

In the following description, a driving torque of the output shalt of the internal combustion engine is referred to as "internal-combustion-engine driving torque", and a driving torque of the output shaft of the electric motor is referred to as "electric-motor driving torque".

In the following description, a hybrid vehicle (hereinafter referred to as "hybrid vehicle with an AMT") having a configuration in which an AMT is installed and the output shaft of the electric motor is connected to the output shaft of the transmission is assumed. In the hybrid vehicle with the AMT, "an electric-motor travel mode" for traveling, in a state in which the clutch torque is maintained to zero, by using only the electric-motor driving torque, and "an internal-combustion-engine travel mode" for traveling, in a state in which the clutch torque is adjusted to a value larger than zero, by using only the internal-combustion-engine driving torque or "both the internal-combustion-engine driving torque and the electric-motor driving torque" can be selectively realized.

In the electric-motor travel mode, the electric-motor driving torque is transmitted, without intermediation of the multiple gear ratio transmission, from the output shaft of the electric motor to the output shaft of the transmission (thus, to drive wheels). As a result, based on the above-mentioned map, the necessity of sequentially changing "the gear position to be realized" is low. In addition, when "the gear position to be realized" is changed, an action sound is unavoidably generated by the change. Due to this action sound, occupants can feel a sense of discomfort.

SUMMARY OF THE INVENTION

It is an object of the present invention to provide a power transmission control device for a vehicle, which is to be applied to a hybrid vehicle with an AMT, and is capable of restraining the state in which occupants feel a sense of discomfort due to the action sound caused by a change in "the gear position to be realized" in the electric-motor travel mode from being generated.

A power transmission control device for a vehicle applied to a hybrid vehicle with an AMT according to an exemplary embodiment of the present invention has a feature in that control means is configured, in a state in which an electric-motor travel mode is selected, to change a gear position to be realized depending on a travel state of the vehicle when it is determined that a speed of the vehicle is higher than a predetermined speed, and to maintain the gear position to be realized to a current gear position independently of the travel state of the vehicle when it is determined that the speed of the vehicle is equal to or lower than the predetermined speed.

In general, when a noise level in a cabin is high, it is hard for occupants to sense an action sound generated in the cabin, and when the noise level in the cabin is low, it is easy for the occupants to sense the action sound generated in the cabin. On this occasion, the noise level in the cabin increases as the vehicle speed increases. According to the above-mentioned configuration, when the vehicle speed is high (thus, the noise level in the cabin is high), without the action sound caused by a change in gear position being sensed by the occupants, "the gear position to be realized" is properly changed depending on the travel state of the vehicle. Moreover, when the vehicle speed is low (thus, the noise level in the cabin is low), the gear position is not changed, and hence the action sound caused by the change in the gear position is not generated. As a result, the situation in which the occupants feel a sense of discomfort from the action sound does not occur.

In the above-mentioned power transmission control device according to the exemplary embodiment of the present invention, it is preferred that the control means be configured, in the state in which the electric-motor travel mode is selected, based on a condition that the vehicle which has been traveling stops, to set the gear position to be realized to a gear position having the largest speed reduction ratio (typically, "1st speed") out of a plurality of gear positions. As a result, when the vehicle is stopping, or immediately before the vehicle stops, a state in which the gear position having the largest speed reduction ratio has already been realized is acquired. Thus, for example, immediately after the vehicle stops, when the vehicle starts in the internal-combustion-engine travel mode, the vehicle can quickly start by using the gear position having the largest speed reduction ratio.

DETAILED DESCRIPTION OF THE INVENTION

Figure 1:
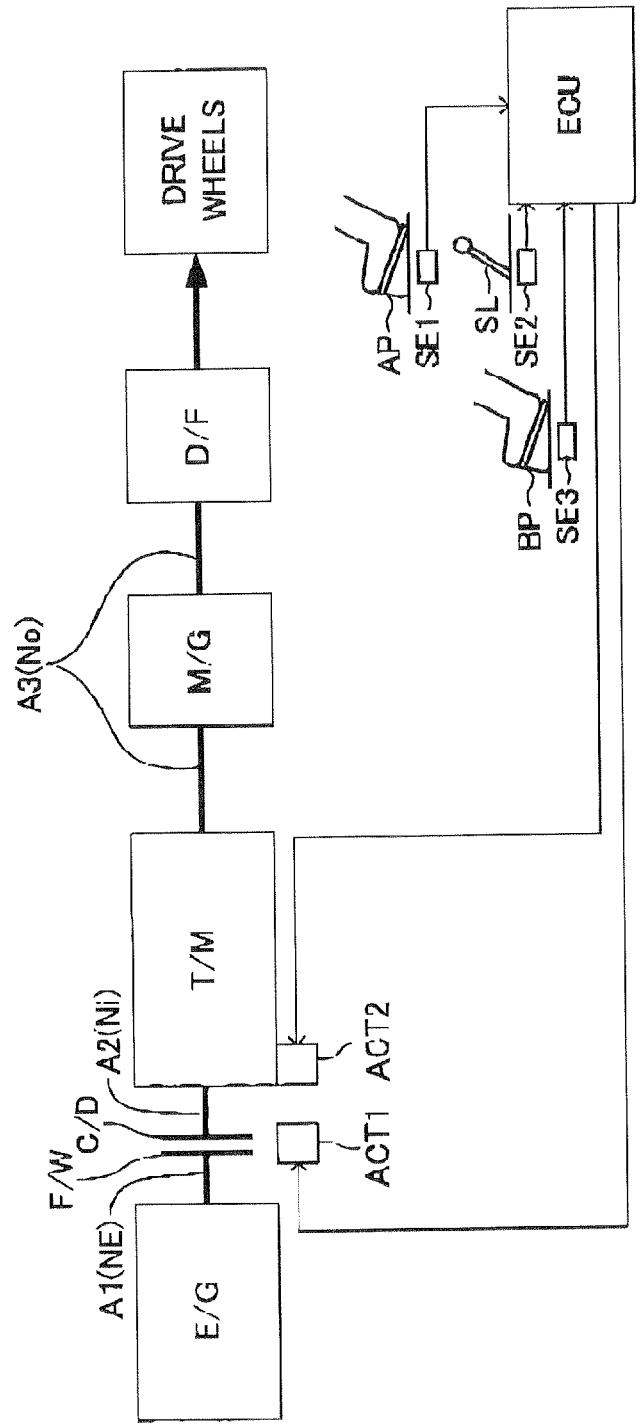
FIG. 1 is a schematic configuration diagram of a vehicle equipped with a power transmission control device for a vehicle according to an embodiment of the present invention.

A description is now given of an embodiment of a power transmission control device for a vehicle according to the present invention, referring to the drawings.

(Configuration)

FIG. 1 illustrates a schematic configuration of a vehicle equipped with a power transmission control device (hereinafter referred to as "this device") according to an embodiment of the present invention. This vehicle is a hybrid vehicle provided with an internal combustion engine and a motor/generator as power sources, and also provided with a so-called automated manual transmission (AMT) using a clutch and a multiple gear ratio transmission without a torque converter.

This vehicle is provided with an engine E/G, a transmission T/M, a clutch C/D, and a motor/generator M/G. The E/G is one of well-known internal combustion engines, and is, for example, a gasoline engine using gasoline as a fuel or a diesel engine using light oil as a fuel. An output shaft A1 of the E/G is connected, via a flywheel F/W and a clutch disk C/D, to an input shaft A2 of the transmission T/M.

The transmission T/M is one of well-known multiple gear ratio transmissions without a torque converter having a plurality of (for example, five) gear positions (shift positions) for forward travel, one gear position (shift position) for backward travel, and a neutral position. An output shaft A3 of the T/M is connected, via a differential gear D/F, to drive wheels of the vehicle.

Figure 2:
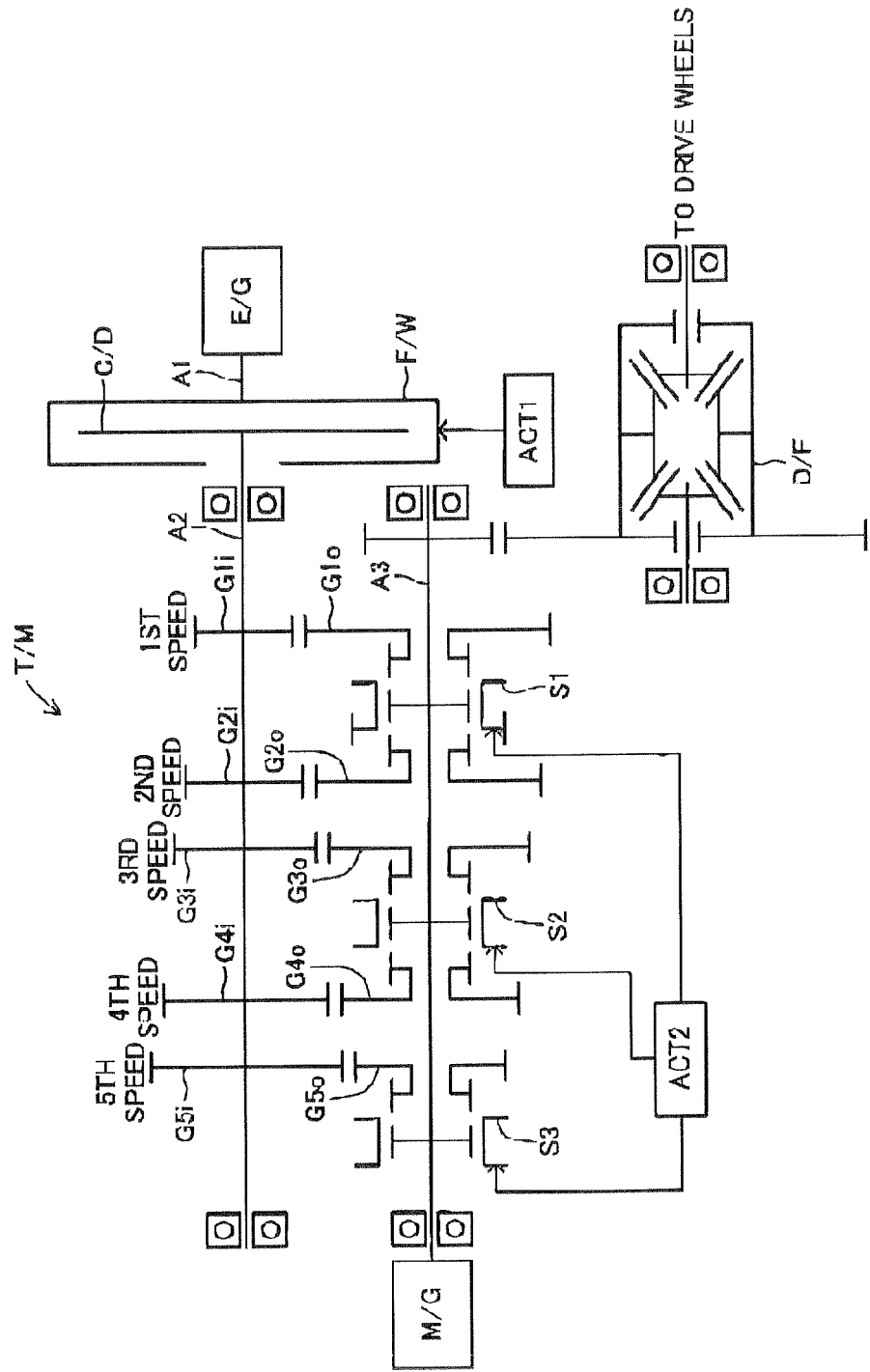
FIG. 2 is a schematic configuration diagram of a transmission illustrated in FIG. 1.

As illustrated in FIG. 2, the T/M includes:

a plurality of fixed gears G1$i$, G2$i$, G3$i$, G4$i$, and G5$i$ respectively provided on the input shaft A2 or the output shaft A3 (in this example, input shaft A2) so as not to relatively rotate, and respectively corresponding to the plurality of gear positions for forward travel;

a plurality of free-rotation gears G1$o$, G2$o$, G3$o$, G4$o$, and G6$o$ respectively provided on the input shaft A2 or the output shaft A3 (in this example, output shaft A3) so as to relatively rotate, respectively corresponding to the plurality of gear positions for forward travel, and always meshing with the fixed gears of the corresponding gear positions; and a plurality of sleeves S1, S2, and S3 respectively provided on a "corresponding shaft" (in this example, output shaft A3) out of the input shaft A2 and the output shaft A3 so as not to relatively rotate and so as to relatively move in an axial direction, and engageable with the corresponding free-rotating gears for respectively fixing corresponding free-rotating gears out of the plurality of free-rotating gears to the "corresponding shaft" (in this example, output shaft A3) so as not to relatively rotate.

The change/setting of the gear position in the T/M is carried out by a transmission actuator ACT2 (see FIG. 1) driving the sleeves S1, S2, and S3, thereby controlling axial positions of the sleeves S1, S2, and 53. The speed reduction ratio (ratio of the rotation speed Ni of the input shaft A2 to the rotation speed No of the output shaft A3) is adjusted by changing the gear position. Specifically, the "speed reduction ratio" of an "N-th" speed is represented by "(number of teeth of GNo)/(number of teeth of GNi)" (N: 1, 2, 3, 4, and 5). The speed reduction ratio gradually decreases from "1st speed" to "5th speed".

The clutch C/D is a friction clutch disk which includes one of well-known configurations and is provided so as to integrally rotate with the input shaft A2 of the transmission T/M. More specifically, to the flywheel FAN provided so as to integrally rotate with the output shaft A1 of the engine E/G, the clutch C/D (more precisely, clutch disk) is coaxially arranged so as to be opposed thereto. The axial position of the clutch C/D (more precisely, clutch disk) with respect to the flywheel F/W is adjustable. The axial position of the clutch C/D is adjusted by the clutch actuator ACT1 (see FIG. 1). Note that, the clutch C/D is not provided with a clutch pedal operated by a driver.

Figure 3:
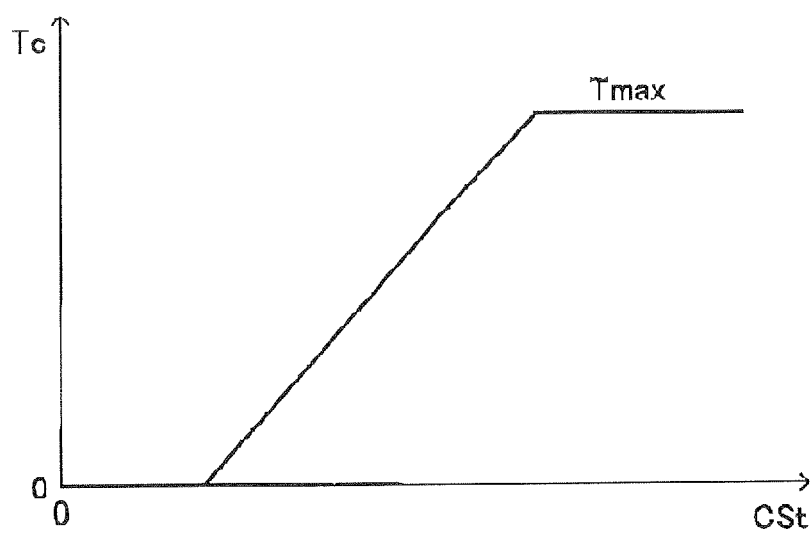
FIG. 3 is a graph showing a map prescribing "stroke-torque characteristic" for a clutch illustrated in FIG. 1.

In the following description, a travel amount in the axial direction from an original position (a position at which the clutch disk is furthest from the flywheel) toward the engaging direction (pressed direction) of the clutch C/D is referred to as clutch stroke CSt. When the clutch C/D is at the "original position", the clutch stroke CSt is "0". As shown in FIG. 3, by adjusting the clutch stroke CSt, the maximum torque (clutch torque Tc), which the clutch C/D can transfer, is adjusted. In a state in which "Tc=0", power is not transmitted between the output shaft A1 of the engine E/G and the input shaft A2 of the transmission T/M. This state is referred to as "disengaged state". Moreover, in a state in which "Tc>0", the power is transmitted between the output shaft A1 and the input shaft A2. This state is referred to as "engaged state".

The motor/generator M/G has one of known structures (such as AC synchronous motor), and, for example, a rotor (not shown) is configured so as to integrally rotate with the output shaft of the M/G. In the example illustrated in FIG. 2, though the output shaft of the M/G is connected integrally and coaxially with the output shaft A3 of the T/M, the output shaft of the M/G may be connected to the output shaft A3 of the T/M via a predetermined gear train. The driving torque of the output shaft of the M/G is transmitted, without intermediation of the T/M, to the output shaft A3 (namely, drive wheels) of the T/M.

This device includes an accelerator opening sensor SE1 for detecting an operated amount (accelerator opening) of the accelerator pedal AP, a shift position sensor SE2 for detecting a position of a shift lever SF, and a brake sensor SE3 for detecting absence/presence of an operation of a brake pedal BP.

Further, this device includes an electronic control unit ECU. The ECU, based on information from the sensors SE1 to SE3 and other sensors and the like, and other such information, controls the actuators ACT1 and ACT2, thereby controlling the clutch stroke CSt (and hence clutch torque Tc) of the C/D and the gear position of the T/M. Moreover, the ECU controls a fuel injection amount of the E/G (opening of a throttle valve), thereby controlling the driving torque of the output shaft A1 of the E/G, and controls an inverter (not shown), thereby controlling the driving torque of the output shaft of the M/G.

As described above, this vehicle is "the hybrid vehicle with the AMT", which is equipped with the AMT and is provided with the configuration in which the output shaft of the M/G is connected to the output shaft A3 of the T/M. In the following description, for convenience of description, the driving torque generated on the output shaft A1 by the combustion of the E/G is referred to as "EG torque Te", and the driving torque on the output shaft of the M/G is referred to as "MG torque Tm". Te and Tm take positive values in the acceleration direction of the vehicle, and take negative values in the deceleration direction.

In this device, an EV travel mode, an EG travel mode, and an HV travel mode are selectively realized, Which of the EV travel mode, the EG travel mode, and the HV travel mode is realized is determined based on the travel state of the vehicle such as the vehicle speed and the accelerator opening.

In the EV travel mode, the E/G is stopped, and, in a state in which the clutch C/D is maintained in the disengaged state (Tc=0), the vehicle travels by using only the MG torque Tm (>0). In the EG travel mode, the MG torque Tm is maintained to hero, the clutch C/D is adjusted to the engaged state (Tc>0), and the vehicle travels by using only the EG torque Te (>0). In the HV travel mode, the clutch C/D is adjusted to the engaged state (Tc>0), and the vehicle travels by using both the EG torque Te (>0) and the MG torque Tm (>0). In the EV travel mode and the HV travel mode, Tm is adjusted based on the travel state of the vehicle such as the accelerator opening. In the EG travel mode and the HV travel mode, Te is adjusted based on the travel state of the vehicle such as the accelerator opening.

Figure 4:
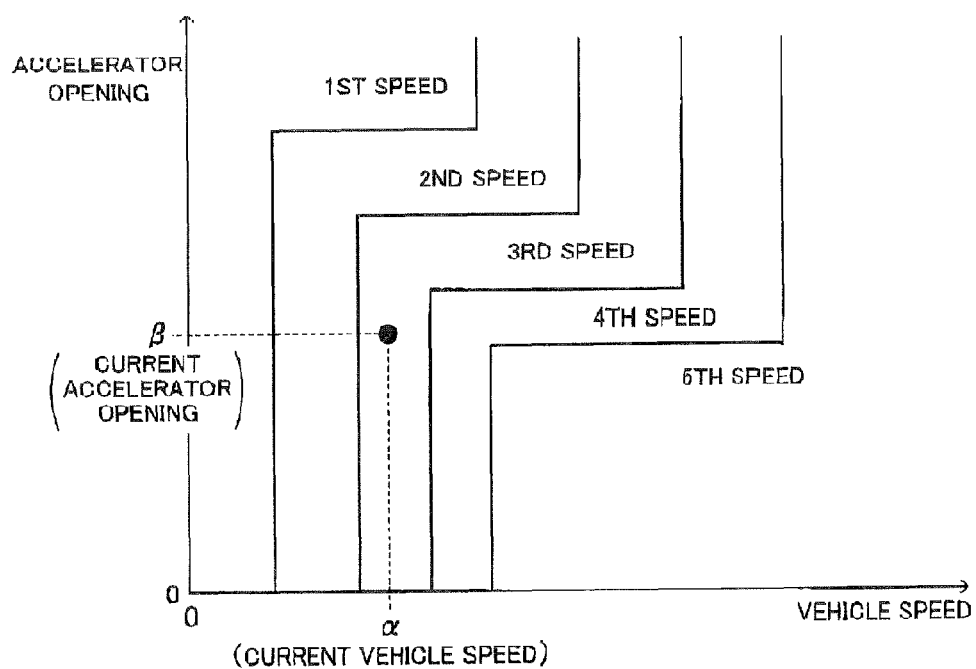
FIG. 4 is a graph showing a map prescribing a relationship between a vehicle speed and an accelerator opening, and a shift position.

In this device, when the shift lover SL is in a position (such as a D range) corresponding to "an automatic mode", based on a gear change map (see FIG. 4) stored in the ROM in the ECU, and the travel state of the vehicle such as the vehicle speed and the accelerator opening, the shift position (gear position to be selected/realized) is selected. For example, when the current vehicle speed is α, and the current accelerator opening is β, "3rd speed" is selected as the shift position. On the other hand, when the shift lever SL is in a position (such as an M (manual) range) corresponding to a "manual mode", the shift position is selected based on the position of the shift lever SL.

In the transmission T/M, generally, a gear position corresponding to a selected shift position is realized. When the shift position changes, the gear change action (action when the gear position is changed) of the T/M is carried out. Before the gear change action starts, the clutch C/D is changed from the engaged state (clutch torque>0) to the disengaged state (clutch torque=0), and, while the clutch is maintained in the disengaged state, the gear change action is carried out, and after the gear change action is finished, the clutch is returned from the disengaged state to the engaged state. Note that, the start of the gear change action corresponds to a start of a movement of the members (specifically, the sleeves) moving in relation to the change in the gear position, and the end of the gear change action corresponds to an end of the movement of the members.

(Inhibition of Change in Gear Position in EV Travel Mode)

In this device, when "the automatic mode" is selected by the SL, generally, without depending on which of the EV travel mode, the EG travel mode, and the HV travel mode is realized, the shift position (namely, the gear position to be realized) is selected/changed based on the above-mentioned gear change map and the travel state of the vehicle (such as accelerator opening and the vehicle speed).

By the way, in the EV travel mode, the MG torque Tm is transmitted, without intermediation of the inside of the T/M, from the output shaft of the M/G to the output shaft A3 (namely, drive wheels) of the T/M. Thus, the necessity of sequentially changing "the gear position to be realized" based on the above-mentioned gear change map (see FIG. 4) is low. In addition, when "the gear position to be realized" is changed, the action sound caused by "the gear change action" is unavoidably generated. Due to this action sound, occupants may feel a sense of discomfort.

On the other hand, when the noise level in the cabin is high, it is hard for the occupants to sense the action sound generated in the cabin, and when the noise level in the cabin is low, it is easy for the occupants to sense the action sound generated in the cabin. On this occasion, the noise level in the cabin increases as the vehicle speed increases.

Then, in this device, in the EV travel mode, when it is determined that the vehicle speed is higher than a predetermined speed Vth (namely, when it is determined that the noise level in the cabin is higher than a predetermined level), "the gear position to be realized" is changed in accordance with the above-mentioned gear change map and the travel state of the vehicle (vehicle speed and the accelerator opening). On the other hand, when it is determined that the vehicle speed is equal to or lower than the predetermined speed Vth (namely, when it is determined that the noise level in the cabin is equal to or less than the predetermined level), "the gear position to be realized" is maintained to the current gear position independently of the travel state of the vehicle. In other words, the change of the gear position is inhibited.

Figure 5:
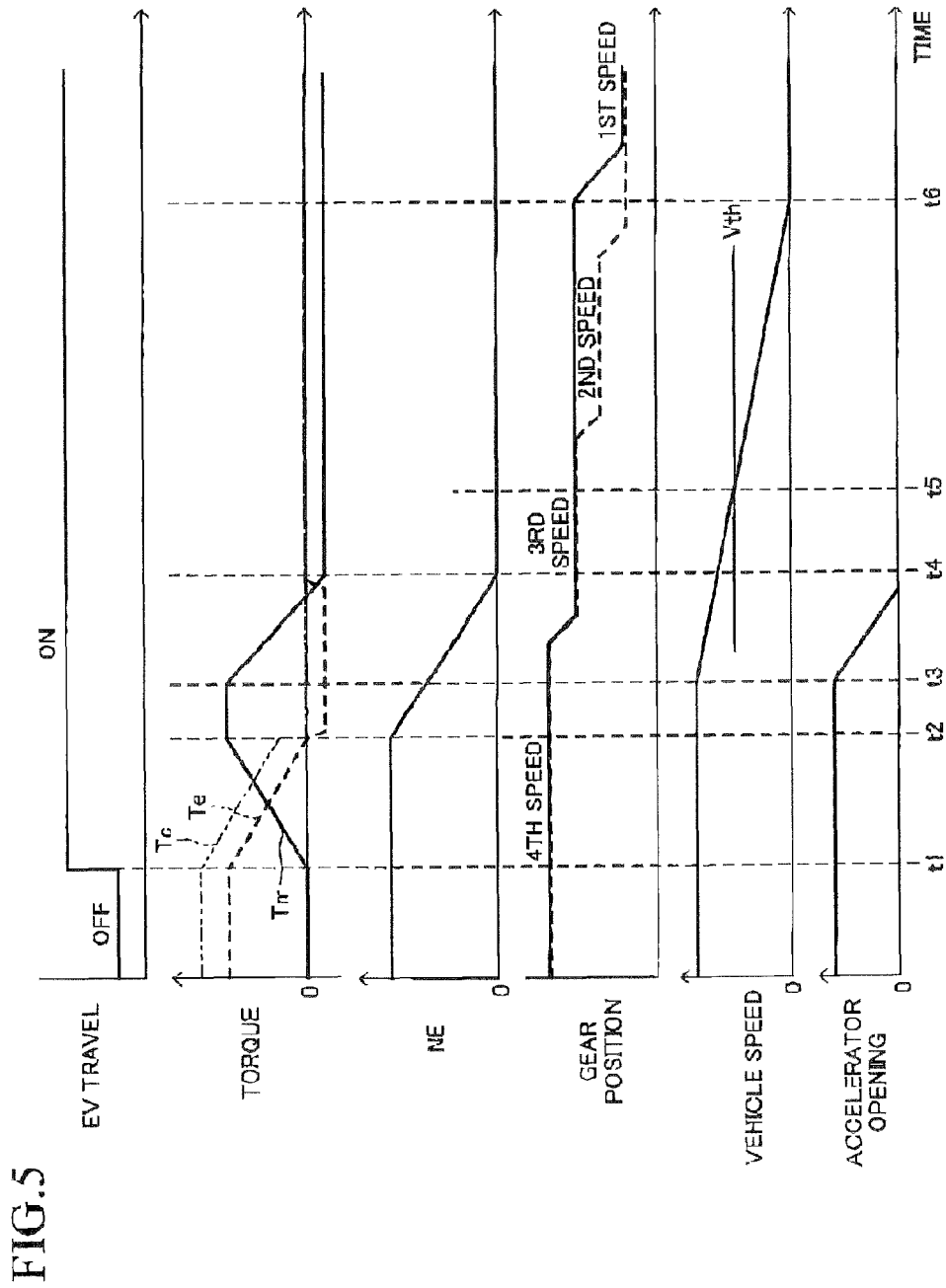
FIG. 5 is a time chart showing an example of a case where a gear position is inhibited from being changed during a travel of an EV according to the embodiment of the present invention.

Referring to FIG. 5, a description is now given of this change. In FIG. 5, an example of the case where "the automatic mode" (D range) is selected/maintained by the SL, a travel mode other than the EV travel mode (specifically, the EG travel mode) is selected before a time t1, and, the EV travel mode is selected after the time t1 is shown. In a row of the "gear position" in FIG. 5, a broken line represents a case where the above-mentioned "change in gear position" is not inhibited, and a solid line represents a case where "the change in gear position" is inhibited by this device.

In the example shown in FIG. 5, with the switching at the time t1 from the EG travel mode to the EV travel mode, after the time t1, the EG torque Te and the clutch torque Tc decrease toward zero, and the MG torque Tm increases from zero. At a time t2, Te reaches zero, and, after the time t2, an engine rotation speed NE decreases toward zero, and reaches zero at a time t4. After the time 14, the E/G is maintained in the stopped state (NE=0).

After the time t2, the clutch torque Tc is maintained to zero (namely, the clutch C/D is maintained in the disengaged state). In other words, after the time t2, the vehicle travels by using only the MG torque.

The accelerator opening is maintained constant until a time t3, and, after the time t3, decreases toward zero. As a result, after the time t3, the MG torque Tm decreases, and, after a time immediately before the time 14, Tm transitions through negative values (so-called regeneration state). As a result, the vehicle speed is also maintained constant until the time t3, and, after the time t3, decreases toward zero.

"The gear position to be realized" is, in accordance with the gear change map (see FIG. 4), maintained to a "4th speed" until the time t3. From the time t3 to the time t4, in response to the decreases in the vehicle speed and the accelerator opening, in accordance with the gear change map (see FIG. 4), the gear change action (change in gear position) from the "4th speed" to the "3rd speed" is carried out. This is, in this stage, based on the condition that the vehicle speed is higher than the predetermined speed Vth. In other words, in this stage, the noise level in the cabin is high, and thus, the action sound caused by the gear change action is hardly sensed by the occupants. Thus, while the action sound caused by the gear change action is not sensed by the occupants, "the gear position to be realized" is properly changed depending on the travel state of the vehicle.

After a time t5, the vehicle speed becomes lower than the predetermined speed Vth. On this occasion, when the above-mentioned "change in gear position" is not inhibited (see the broken line), after the time t5, in response to the decreases in the vehicle speed and the accelerator opening, in accordance with the gear change map (see FIG. 4), the gear change actions (change in gear position) from the "3rd speed" to the "2nd speed" and then from the "2nd speed" to the "1st speed" are sequentially carried out. In this state, the noise level in the cabin is low, and hence the action sound caused by the gear change action is sensed by the occupants.

In contrast, in this device, after the time t5, until a time t6 at which the vehicle stops, "the gear position to be realized" is maintained to the current gear position (in this example, the "3rd speed"). In other words, during this period, the gear change action is not carried out. In this way, in this device, when the noise level in the cabin is low, the gear change action is not carried out. Thus, the action sound caused by the gear change action is not generated. Thus, the situation in which the occupants feel a sense of discomfort from the action sound does not occur.

In this device, at the time t6 when the vehicle stops, a gear change action from the gear position (in this example, the "3rd speed"), which has been maintained until that time, to the "1st speed" is carried out. As a result, immediately after the vehicle stops, a state in which "the gear position having the largest speed reduction ratio" (namely, a gear position to start the vehicle) has already been realized is acquired. Thus, for example, immediately after the vehicle stops (in this example, after the time t6), when the vehicle starts in the EG travel mode or the HV travel mode, the vehicle can quickly start using "the gear position having the largest speed reduction ratio".

Note that, in this example, at a time point at which it is determined that the vehicle stops (namely, time point at which it is determined that the vehicle speed is changed from a speed other than zero to zero), "the gear position to be realized" is changed to the "the gear position having the largest speed reduction ratio". However, at a time point at which it is determined that the vehicle is about to stop (namely, a time point at which it is determined that the vehicle speed passes a minute value larger than zero while decreasing), "the gear position to be realized" may be changed to "the gear position having the largest speed reduction ratio".

As described above, according to this device, in the EV travel mode, when the vehicle speed is higher than the predetermined speed Vth (namely, the noise level in the cabin is high), without the action sound caused by the gear change action being sensed by the occupants, "the gear position to be realized" is properly changed depending on the travel state of the vehicle. Moreover, when the vehicle speed is equal to or lower than the predetermined speed Vth (namely, the noise level in the cabin is low), the gear position is not changed, and the action sound caused by the change in the gear position is not generated. Thus, the situation in which the occupants feel a sense of discomfort from the action sound does not occur.

Moreover, according to this device, in the EV travel mode, based on the condition that the traveling vehicle stops, "the gear position to be realized" is changed to the "1st speed" (gear position having the largest speed reduction ratio). Thus, immediately after the vehicle stops, when the vehicle starts in the EG travel mode or the HV travel mode, the vehicle can quickly start using the gear position having the largest speed reduction ratio.

The present invention is not limited to the above-mentioned embodiment, and various modifications can be employed within the scope of the present invention. For example, according to the embodiment, the three types of travel modes, that is, the EV travel mode, the EG travel mode, and the HV travel mode, are selectively realized. However, there may be provided such a configuration that two types of travel modes, that is, the EV travel mode and the EG travel mode, may be selectively realized (namely, that the HV travel mode cannot be realized).

What is claimed is:

1. A power transmission control device for a vehicle, which is to be applied to a vehicle comprising an internal combustion engine and an electric motor as power sources, the power transmission control device comprising:
    a multiple gear ratio transmission including an input shaft for inputting a power from an output shaft of the internal combustion engine and an output shaft for outputting a power to drive wheels of the vehicle, and having a plurality of predetermined gear positions different in speed reduction ratio, which is a ratio of a rotation speed of the input shaft to a rotation speed of the output shaft, the output shaft of the multiple gear ratio transmission inputting a power from an output shaft of the electric motor without intermediation of a power transmission line between the input shaft and the output shaft of the multiple gear ratio transmission;
    a clutch interposed between the output shaft of the internal combustion engine and the input shaft of the multiple gear ratio transmission, the clutch being capable of adjusting a clutch torque, which is a maximum value of a torque transmittable by the clutch;
    a first actuator for controlling the clutch to adjust the clutch torque;
    a second actuator for controlling the multiple gear ratio transmission to change a gear position to be realized out of the plurality of gear positions; and
    control means for controlling, based on a travel state of the vehicle, an internal-combustion-engine driving torque, which is a driving torque of the output shaft of the internal combustion engine, an electric-motor driving torque, which is a driving torque of the output shaft of the electric motor, the first actuator, and the second actuator,
    the control means being configured to selectively realize, based on the travel state of the vehicle, an electric-motor travel mode for traveling by using only the electric-motor driving torque in a state in which the clutch torque is maintained to zero, and an internal-combustion-engine travel mode for traveling by using one of only the internal-combustion-engine driving torque and both the internal-combustion-engine driving torque and the electric-motor driving torque in a state in which the clutch torque is adjusted to a value larger than zero,
    wherein the control means is configured, in a state in which the electric-motor travel mode is selected, to change the gear position to be realized depending on the travel state of the vehicle when it is determined that a speed of the vehicle is higher than a predetermined speed, and to maintain the gear position to be realized to a current gear position independently of the travel state of the vehicle when it is determined that the speed of the vehicle is equal to or lower than the predetermined speed.

2. A power transmission control device for a vehicle according to claim 1, wherein the control means is configured, in the state in which the electric-motor travel mode is selected, based on a condition that the vehicle which has been traveling stops, to set the gear position to be realized to a gear position having a largest speed reduction ratio out of the plurality of gear positions.

3. A power transmission control device for a vehicle according to claim 1, wherein the control means is configured, in the state in which the electric-motor travel mode is selected, to change the gear position to be realized when it is determined that the speed of the vehicle is higher than the predetermined speed, based on a predetermined relationship of at least an operated amount of an acceleration operation member operated by a driver and the speed of the vehicle with respect to the gear position to be realized, and at least a current operated amount of the acceleration operation member and a current speed of the vehicle, and to maintain the gear position to be realized to a current gear position when it is determined that the speed of the vehicle is equal to or lower than the predetermined speed, independently of the predetermined relationship, the current operated amount of the acceleration operation member, and the current speed of the vehicle.

4. A power transmission control device for a vehicle according to claim 2, wherein the control means is configured, in the state in which the electric-motor travel mode is selected, to change the gear position to be realized when it is determined that the speed of the vehicle is higher than the predetermined speed, based on a predetermined relationship of at least an operated amount of an acceleration operation member operated by a driver and the speed of the vehicle with respect to the gear position to be realized, and at least a current operated amount of the acceleration operation member and a current speed of the vehicle, and to maintain the gear position to be realized to a current gear position when it is determined that the speed of the vehicle is equal to or lower than the predetermined speed, independently of the predetermined relationship, the current operated amount of the acceleration operation member, and the current speed of the vehicle.

* * * * *